(12) United States Patent
Sakurai et al.

(10) Patent No.: US 10,558,033 B2
(45) Date of Patent: Feb. 11, 2020

(54) LIGHT DEFLECTOR

(71) Applicant: STANLEY ELECTRIC CO., LTD., Meguro-ku, Tokyo (JP)

(72) Inventors: Makoto Sakurai, Tokyo (JP); Takaaki Koyama, Tokyo (JP); Tomotaka Asari, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/278,149

(22) Filed: Feb. 17, 2019

(65) Prior Publication Data

US 2019/0258049 A1  Aug. 22, 2019

(30) Foreign Application Priority Data

Feb. 21, 2018  (JP) ................. 2018-028668

(51) Int. Cl.
G02B 26/08 (2006.01)
G02B 26/10 (2006.01)

(52) U.S. Cl.
CPC ....... G02B 26/0858 (2013.01); G02B 26/101 (2013.01)

(58) Field of Classification Search
CPC .. G02B 26/0858; G02B 26/101; G02B 26/08; G02B 26/10; G02B 26/0816; G02B 26/0833; B81B 3/00

USPC ..................................... 359/199.4
See application file for complete search history.

(56) References Cited

U.S. PATENT DOCUMENTS

2015/0277107 A1* 10/2015 Aimono ............. G02B 26/0858
359/198.1

FOREIGN PATENT DOCUMENTS

JP   2015184590 A   10/2015
JP   2017207630 A   11/2017

* cited by examiner

*Primary Examiner* — Euncha P Cherry
(74) *Attorney, Agent, or Firm* — Holtz, Holtz & Volek PC (57) ABSTRACT

A light deflector 1 includes a reflector (2), inner piezoelectric actuators (4), an inner frame (5), outer piezoelectric actuators (6), and an outer frame (7). The reflector (2) is oscillated about a first axis Ua and a second axis Ub by the inner piezoelectric actuators (4) and the outer piezoelectric actuators (6), respectively. Formed on the rear surface of the light deflector 1 is a projecting rib (52), which projects from an encircling rib (51) of the inner frame (5) and reaches a corner portion (36) of a distal end portion of a piezoelectric cantilever (13a). A vertical side (22b) has an outer recess (35). The outer recess (35) extends along the projecting rib (52) in a portion of the distal end side of the piezoelectric cantilever (13a).

4 Claims, 5 Drawing Sheets

LIGHT DEFLECTOR

BACKGROUND OF THE INVENTION

1. Field of the Invention

The present invention relates to a light deflector that outputs incident light as scanning light about two axes.

2. Description of the Related Art

As a light deflector of a Micro Electro Mechanical System (MEMS), there has been known a light deflector which oscillates a reflector about two axes by a piezoelectric actuator and deflects incident light by the reflection of the reflector and then outputs the incident light as two-dimensional scanning light (e.g. Japanese Patent Application Laid-Open No. 2017-207630 and Japanese Patent Application Laid-Open No. 2015-184590).

In the light deflector of the MEMS described in Japanese Patent Application Laid-Open No. 2015-184590, an encircling rib is formed on the rear surface side of an inner frame that supports a reflector through torsion bars, and a projecting rib, which projects from the encircling rib and further projects into an outer piezoelectric actuator, is formed on the rear surface side of the outer piezoelectric actuator.

In the light deflector described in Japanese Patent Application Laid-Open No. 2015-184590, the joining strength between the inner frame and the outer piezoelectric actuator has been increased by the encircling rib and the projecting rib, but an increase of a limit deflection angle of the reflector is insufficient. The limit deflection angle refers to a deflection angle at which any one part of the light deflector is damaged, making it difficult to further increase the deflection angle, in the process of gradually increasing the deflection angle of the reflector when the drive voltage of the piezoelectric actuator is gradually increased at a reference frequency while testing the light deflector.

SUMMARY OF THE INVENTION

An object of the present invention is to provide a light deflector capable of increasing the limit deflection angle of a reflector while securing the strength of joining of an outer piezoelectric actuator to an inner frame.

A light deflector according to the present invention includes:

a reflector which reflects light incident upon a front surface side;

an inner frame which surrounds the reflector;

an outer frame which surrounds the inner frame;

a pair of torsion bars which extend out of the reflector in the direction of a first axis out of the first axis and a second axis, which intersect with each other at right angles at the center of the reflector;

an inner piezoelectric actuator which is interposed between the inner frame and the pair of torsion bars and which oscillates the reflector about the first axis through the pair of torsion bars; and an outer piezoelectric actuator which has a plurality of piezoelectric cantilevers connected by a meander pattern configuration, in which a first piezoelectric cantilever and a last piezoelectric cantilever in a configuration order from the inner frame side to the outer frame side are connected to the inner frame and the outer frame, respectively, and which oscillates the inner frame about the second axis, wherein an encircling rib is formed on the rear surface of the inner frame such that the encircling rib encircles the inner frame, a projecting rib is formed on the rear surface of a distal end portion of the first piezoelectric cantilever such that the projecting rib projects from the encircling rib and extends toward the area of a corner portion of the first piezoelectric cantilever, the area of the corner being adjacent to a second piezoelectric cantilever, the first piezoelectric cantilever has an outer recess which is concave toward the inner frame on one vertical side adjacent to the second piezoelectric cantilever, and the outer recess extends along the projecting rib at the corner portion in a part on the distal end side of the first piezoelectric cantilever.

According to the present invention, the encircling rib and the projecting rib provide a large force of joining of the outer piezoelectric actuator to the inner frame. On the other hand, a step is created on the rear surface of the distal end portion of the first piezoelectric cantilever due to the projecting rib, and stress tends to be concentrated on the step. The outer recess effectively releases the stress attributable to the step, thereby reducing damage in the vicinity of the step of the distal end portion of the first piezoelectric cantilever. This makes it possible to increase the limit deflection angle of the reflector.

Preferably, in the light deflector according to the present invention, the projecting end of the projecting rib is directed toward the distal end of the first piezoelectric cantilever.

With this arrangement, stress in the vicinity of the outer recess can be lessened, thus enabling a further increase of the limit deflection angle of the reflector.

Preferably, in the light deflector according to the present invention, the other vertical side of the first piezoelectric cantilever that is adjacent to the inner frame has an inner recess that is concave toward the second piezoelectric cantilever in the distal end portion.

With this arrangement, the combination of the outer recess and the inner recess makes it possible to enhance the damage control effect in the distal end portion of the first piezoelectric cantilever.

Preferably, in the light deflector according to the present invention, the inner frame is formed to have an annular shape or an annular shape that is longer in the direction of the first axis than in the direction of the second axis.

Especially when the inner frame is formed to have an annular shape that is longer in the direction of the first axis than in the direction of the second axis, the stress that occurs, while the light deflector is in operation, at a portion where the piezoelectric cantilever of the outer piezoelectric actuator is joined to the inner frame can be reduced.

BRIEF DESCRIPTION OF THE DRAWINGS

The disclosed technique will be understood and appreciated more fully from the following detailed description taken in conjunction with the drawings in which.

DESCRIPTION OF THE PREFERRED EMBODIMENTS

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

(Overall Configuration of the Light Deflector)

Figure 1:
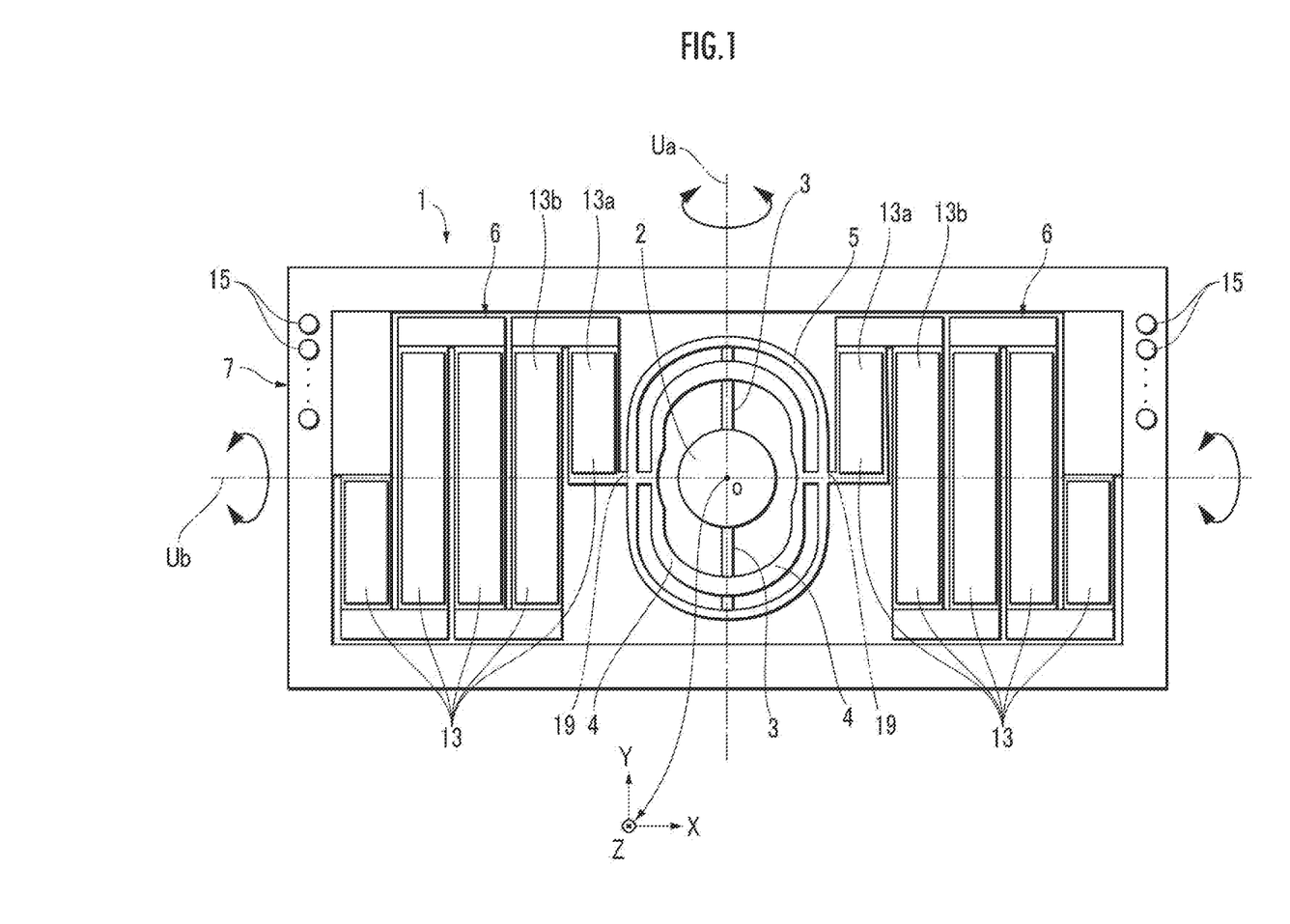
FIG. 1 is a front view of a light deflector.

FIG. 1 is a front view of a light deflector 1. The front of the light deflector 1 refers to the surface (the surface on the front surface side) on which various types of layers are deposited when the light deflector 1 as a MEMS is fabricated, using a silicon on insulator (SOI) board 40 (FIGS. 3A and 3B) as a substrate. Further, the rear surface of the light deflector 1 refers to the surface on the rear side in the light deflector 1 on a flat board.

The light deflector 1 is configured to be laterally symmetrical in a front view, and includes, in the arrangement order from a center O of the light deflector 1 to the outside, a reflector 2, torsion bars 3, inner piezoelectric actuators 4, an inner frame 5, outer piezoelectric actuators 6, and an outer frame 7. The torsion bars 3 are disposed in a paired manner, one each on the upper side and the lower side with respect to the reflector 2 in a front view. The inner piezoelectric actuators 4 and the outer piezoelectric actuators 6 are disposed in the paired manner, one each on the left side and the right side with respect to the reflector 2 in the front view.

For the convenience of the explanation of the configuration of the light deflector 1, a three-axis coordinate system, in which axes are mutually orthogonal at an origin, will be defined. The light deflector 1 includes movable elements that are displaced as the inner piezoelectric actuators 4 and the outer piezoelectric actuators 6 are driven; however, the position of the center O of the light deflector 1 remains unchanged. The center O of the light deflector 1 also provides the centers of the reflector 2, the inner piezoelectric actuators 4, the inner frame 5, and the outer piezoelectric actuators 6, and the centers also remain immovable. The origin of the three-axis coordinate system is set at the immovable center O.

An X-axis, a Y-axis and Z-axis intersect at right angles at the center O. The X-axis and the Y-axis are set in parallel to the long sides and the short sides, respectively, of the rectangular outer frame 7. The Z-axis is set in parallel to the direction of the thickness of the tabular light deflector 1.

Outgoing light from a light source (e.g. a laser light source), which is not illustrated, enters the center O of the reflector 2. The center O is the center of not only the reflector 2 but also the center of each of the inner frame 5 and the outer frame 7. The inner frame 5 surrounds the reflector 2 and the torsion bars 3. The outer frame 7 surrounds the inner frame 5.

The light incident upon the center O is deflected in a direction based on the direction of the normal line of the reflector 2 at the center O, and exits from the light deflector 1. When the inner piezoelectric actuators 4 and the outer piezoelectric actuators 6 are being driven, the reflector 2 oscillates about a first axis Ua and a second axis Ub, so that the deflected light from the light deflector 1 will be two-dimensional scanning light. The first axis Ua and the second axis Ub coincide with the Y-axis and the X-axis, respectively, while the light deflector 1 is not in operation, i.e. while the inner piezoelectric actuators 4 and the outer piezoelectric actuators 6 are not being driven.

The torsion bars 3 extend along the first axis Ua from the reflector 2 and are joined to the inner circumference of the inner frame 5. The torsion bars 3 are joined, at the middle thereof to the upper and lower end portions of the left and right inner piezoelectric actuators 4. In the present embodiment, the shape formed by the left and right inner piezoelectric actuators 4 joined to each other and the shape of the inner frame 5 are longer in the Y-axis direction like the track of an athletic stadium in a front view.

The outer piezoelectric actuators 6 have a plurality of (five in the light deflector 1, which is illustrated) cantilevers 13 which are connected in a meander pattern configuration, the longitudinal direction thereof being in parallel to the Y-axis. For individual identification, each of the plurality of piezoelectric cantilevers 13 is identified by the number assigned based on the arrangement order starting from the inner frame 5.

The outer piezoelectric actuators 6 are interposed between the inner frame 5 and the outer frame 7. In the outer piezoelectric actuators 6, the lengths in the Y-axis direction (the lengths in the longitudinal direction of the piezoelectric cantilevers 13) of a first piezoelectric cantilever 13 and a last-numbered piezoelectric cantilever 13 in the arrangement order of the plurality of piezoelectric cantilevers 13 placed from the inner frame 5 to the outer frame 7 in the outer piezoelectric actuators 6 are set to be substantially half the lengths of the remaining piezoelectric cantilevers 13, and the first piezoelectric cantilever 13 and the last-numbered piezoelectric cantilever 13 are connected to the inner frame 5 and the outer frame 7, respectively. In FIG. 1, for the convenience of explanation to be given later, the first and a second piezoelectric cantilevers 13 in the arrangement order are illustrated with reference numerals 13a and 13b, respectively, in addition to reference numeral 13. Roots 19 are the end edges that join the piezoelectric cantilevers 13a to the inner frame 5.

Electrode pads 15 are formed on the surfaces of the left and right side portions of the outer frame 7. When the light deflector 1 is sealed in a package (not illustrated), the electrode pads 15 are connected to corresponding terminals in the package through bonding wires (not illustrated). The electrode pads 15 are connected to corresponding electrodes of a piezoelectric structure 47 (FIGS. 3A and 3B) of the inner piezoelectric actuators 4 and the outer piezoelectric actuators 6 through the internal wiring of a wiring layer in the light deflector 1.

[Overall Operation of the Light Deflector]

Drive voltages of a first frequency (e.g. 15 to 25 kHz) are supplied in reverse phases to the left and right inner piezoelectric actuators 4 from the left and right electrode pads 15. The inner piezoelectric actuators 4 are interposed between the torsion bars 3 and the inner frame 5. The reflector 2 is oscillated about the first axis Ua at the first frequency by twisting the torsion bars 3. Resonance is utilized for the oscillation.

Drive voltages of a second frequency (e.g. 60 Hz), which has a reverse phase relationship between odd-numbered (a first, a third and a fifth) piezoelectric cantilevers 13 and even-numbered (a second and a fourth) piezoelectric cantilevers 13 in the foregoing arrangement order, are supplied to the outer piezoelectric actuators 6 from the left and right electrode pads 15. This causes odd-numbered piezoelectric cantilevers 13 and the even-numbered piezoelectric cantilevers 13 to curve in the opposite directions in the Z-axis direction. The outer piezoelectric actuators 6 oscillate the inner frame 5 at the second frequency about the X-axis at an oscillation angle based on the total amount of the amounts of rotation of the piezoelectric cantilevers 13 about the second axis Ub. As the inner frame 5 oscillates about the X-axis, the reflector 2 oscillates about the second axis Ub at the second frequency. The oscillation of the reflector 2 about the second axis Ub does not utilize resonance, and the second frequency is lower than the first frequency.

The light that enters the center O of the reflector 2 from the light source is deflected in the direction according to the oscillation angle of the reflector 2 about the first axis Ua and the second axis Ub, reflected on the reflector 2, and exits. The direction of the deflection changes from moment to moment according to the changing deflection angle of the reflector 2 while the light deflector 1 is in operation. As a result, the reflected light of the reflector 2 turns into scanning light that scans about the second axis Ub at the second frequency while scanning about the first axis Ua at the first frequency.

(Configuration of the Distal End Portion of the Piezoelectric Cantilever)

Figure 2:
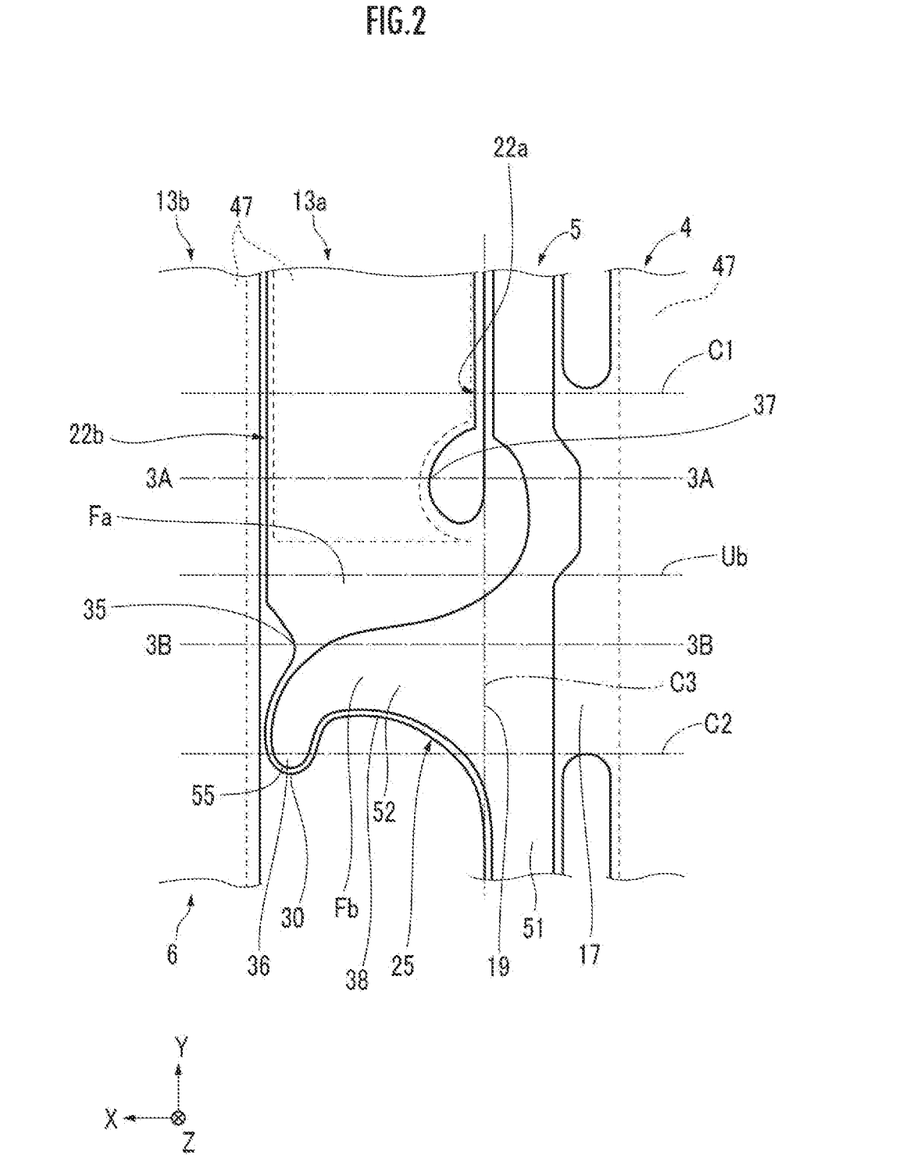
FIG. 2 is an enlarged view of the included range of the distal end portion of a piezoelectric cantilever of an outer piezoelectric actuator in FIG. 1, which is observed from a rear surface side.
Figure 3A:
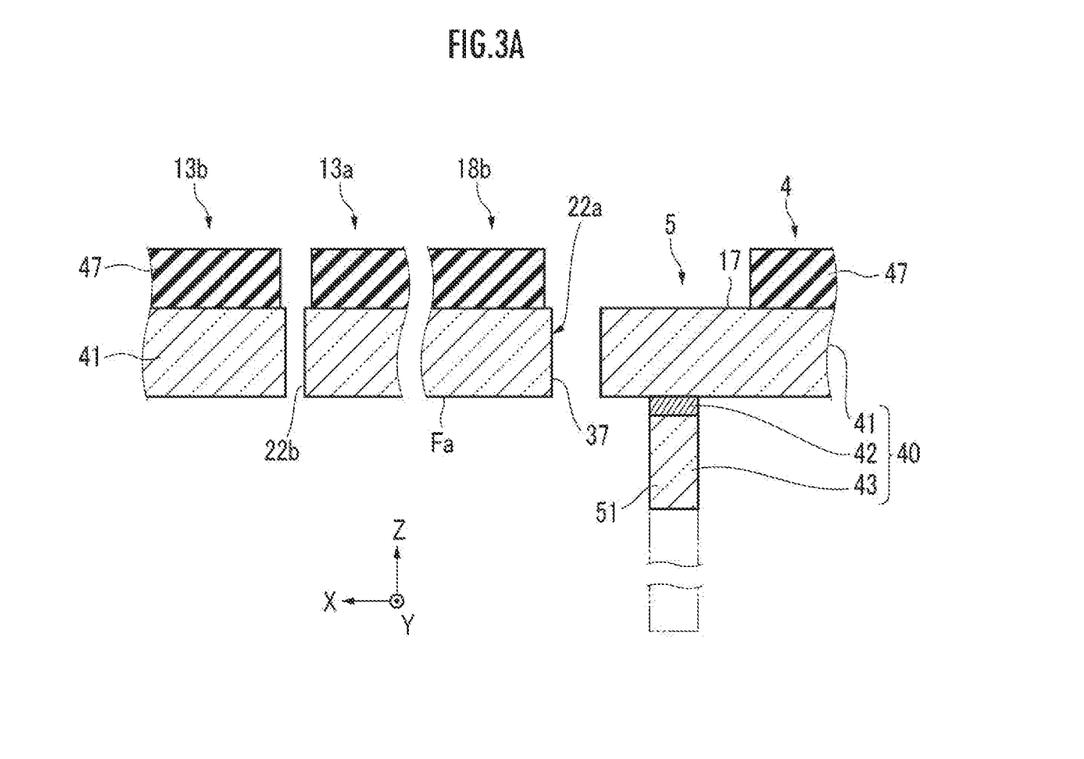
FIG. 3A is a sectional view taken along line 3A-3A of FIG. 2.
Figure 3B:
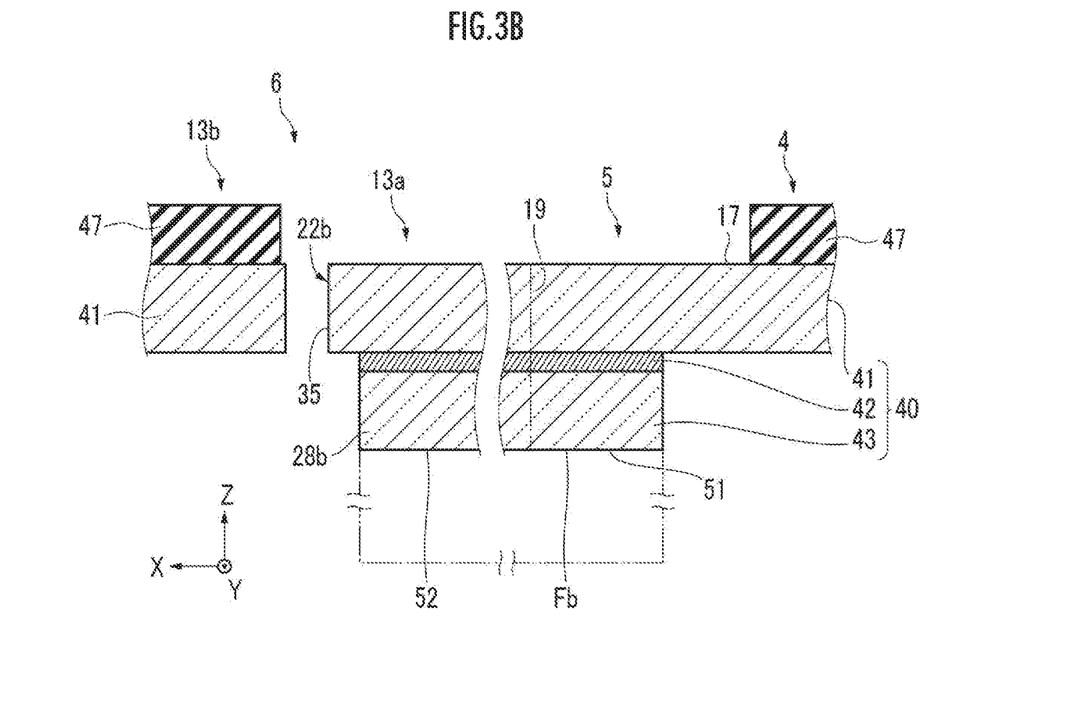
FIG. 3B is a sectional view taken along line 3B-3B of FIG. 2.

FIG. 2 is an enlarged view of the distal end portion of the piezoelectric cantilever 13a of FIG. 1, which is observed from the rear surface side. FIGS. 3A and 3B are related to the section of the distal end portion, FIG. 3A being a sectional view taken along line 3A-3A of FIG. 2, and FIG. 3B being a sectional view taken along line 3B-3B of FIG. 2.

In FIG. 2, and FIGS. 4A to 4C and FIGS. 5A and 5B, which will be discussed later, the outlines of an encircling rib 51 and a projecting rib 52 and the visible outlines of the inner frame 5 and the piezoelectric cantilever 13a, which are viewed from the rear surface, do not overlap, and a fixed-width interval is provided between the two in the drawings. However, the interval is shown in order to avoid the difficulty in viewing due to the overlapping of the two, and in the actual structure, the two overlap when viewed from the rear surface.

Referring to FIG. 2, the inner frame 5 is joined to the outer peripheries of the inner piezoelectric actuators 4 by an overhanging part 17 that extends toward the inner piezoelectric actuators 4 in the X-axis direction. Marking lines C1 and C2 are straight lines that overlap the side edges on both sides in the Y-axis direction of the overhanging part 17 observed in the rear surface view. The X-axis coincides with the centerlines of the marking lines C1 and C2.

A marking line C3 is drawn along the boundary line between the inner frame 5 and the piezoelectric cantilever 13a, and corresponds to the root 19 at which the piezoelectric cantilever 13a is joined to the inner frame 5. The root 19 exists within a range that overlaps the overhanging part 17 in the Y-axis direction. In the following description, in the piezoelectric cantilever 13a, the portion on the negative side (the lower side in FIG. 2) relative to the marking line C1 in the Y-axis direction will be referred to as "the distal end portion" of the piezoelectric cantilever 13a.

The piezoelectric cantilever 13a has a vertical side 22a adjacent to the inner frame 5, a vertical side 22b adjacent to the piezoelectric cantilever 13b, and a horizontal side 25 that extends to the root 19 in the X-axis direction from the vertical side 22b. The piezoelectric cantilever 13a has a proximal end and a distal end in the longitudinal direction (the Y-axis direction), the end thereof joined to the piezoelectric cantilever 13b corresponds to the proximal end of the piezoelectric cantilever 13a, and the end thereof adjacent to the horizontal side 25 corresponds to the distal end.

A corner 30 of the piezoelectric cantilever 13a provides the boundary between the vertical side 22b and the horizontal side 25. A corner portion 36 is defined by the vertical side 22b and the horizontal side 25 and exists as the corner portion of the piezoelectric cantilever 13a on the piezoelectric cantilever 13b side. The corner 30 exists, in the corner portion 36, on the outline of the piezoelectric cantilever 13a.

The position of the corner 30 is set at a position where a tangent line passing the corner 30 inclines 45 degrees with respect to X-axis and Y-axis when the corner portion 36 is viewed from the Z-axis direction.

An outer recess 35 is formed in a part of the vertical side 22b in the distal end portion closer to the marking line C2 than the marking line C1 (e.g. between the second axis Ub and the marking line C2 in the Y-axis direction). The outer recess 35 is bisected to a proximal portion and a distal portion on the basis of the definition of the distal side and the proximal side in the longitudinal direction of the piezoelectric cantilever 13a. In the distal end portion (the lower portion of the outer recess 35 in FIG. 2), the outer recess 35 extends along the contour of the projecting rib 52 in the corner portion 36. In the proximal end portion (the upper portion of the outer recess 35 in FIG. 2), the outer recess 35 extends away from the projecting rib 52. A projecting end 55 of the projecting rib 52 projects from the encircling rib 51 and extends to the corner portion 36. More specifically, the projecting end 55 extends beyond the marking line C2 and reaches the corner 30 at the distal end of the corner portion 36 as an area.

Referring to FIGS. 3A and 3B, a description will be given of the laminated structure of the distal end portion of the piezoelectric cantilever 13a.

In FIGS. 3A and 3B, the light deflector 1 uses an SOI board 40 as the substrate. The laminated structure of the SOI board 40 includes an active layer 41, a BOX layer 42 and a support layer 43, which are deposited from the front surface side. The active layer 41 and the support layer 43 are composed of silicon (Si), and the BOX layer 42 is composed of silicon dioxide. Technically, the two surfaces, namely, the front surface and the rear surface, of the SOI board 40 are both coated with thin oxide film layers (not illustrated).

In the inner piezoelectric actuators 4 and the outer piezoelectric actuators 6, a piezoelectric structure 47 is deposited on the front surface side of the active layer 41. Although not illustrated, the piezoelectric structure 47 has a laminated structure that includes three layers, namely, an upper electrode layer of a conductor, a piezoelectric film layer of lead zirconate titanate (PZT), and a lower electrode layer of a conductor, which are deposited in this order from the front surface side.

In FIG. 2 and FIGS. 3A and 3B, the encircling rib 51 is formed on the rear surface side of the inner frame 5. The encircling rib 51 encircles along the frame shape of the inner frame 5. The projecting rib 52 continues to the encircling rib 51 and enters into the distal end portion of the piezoelectric cantilever 13a beyond the root 19 from the encircling rib 51.

The encircling rib 51 and the projecting rib 52 are formed by etching from the rear surface side of the SOI board 40 in the process of fabricating the light deflector 1. Referring to FIGS. 3A and 3B, the two-dot chain line continuing from the lower end of the support layer 43 is given as a reference to indicate the original thickness of the support layer 43 before being cut away. The support layer 43 of the outer frame 7 (FIG. 1) is not etched, so that the lower surface of the support layer 43 of the outer frame 7 coincides with the position of the lower surface of the two-dot chain line in FIGS. 3A and 3B in the Z-axis direction.

On the rear surface of the distal end portion of the piezoelectric cantilever 13a, the portion where the encircling rib 51 and the projecting rib 52 exist protrudes from the rear surface of the active layer 41, because not all the support layer 43 is cut away. On the rear surface, the portion where the encircling rib 51 and the projecting rib 52 are not formed exposes the rear surface of the active layer 41, because the BOX layer 42 and the support layer 43 are completely removed.

As a result, the rear surface of the distal end portion of the piezoelectric cantilever 13a includes an area without rib Fa, which has a small amount of protrusion toward the rear surface due to the absence of the projecting rib 52, and an area with rib Fb, which has a large amount of protrusion toward the rear surface due to the presence of the encircling rib 51 and the projecting rib 52. A step occurs at the boundary between the area without rib Fa and the area with rib Fb. Further, the stress acting on the piezoelectric cantilever 13a tends to be concentrated on the area in the vicinity of the step of the distal end portion of the piezoelectric cantilever 13a while the light deflector 1 is being operated.

Figure 5A:
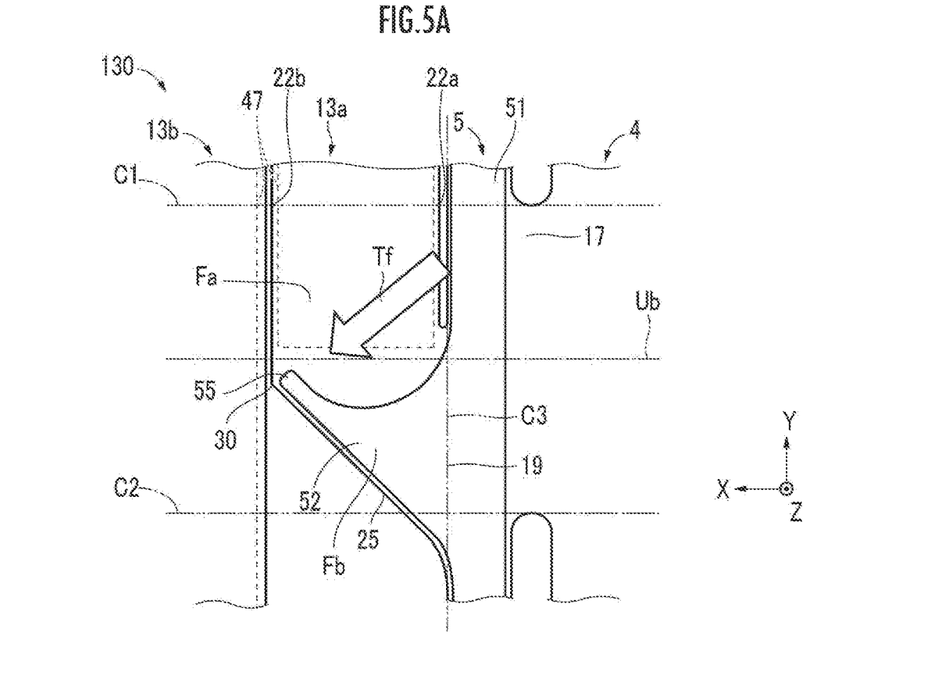
FIG. 5A and FIG. 5B are diagrams illustrating the structures of the distal end portions of various comparative examples that are different from those illustrated in FIGS. 4A to 4C.
Figure 5B:
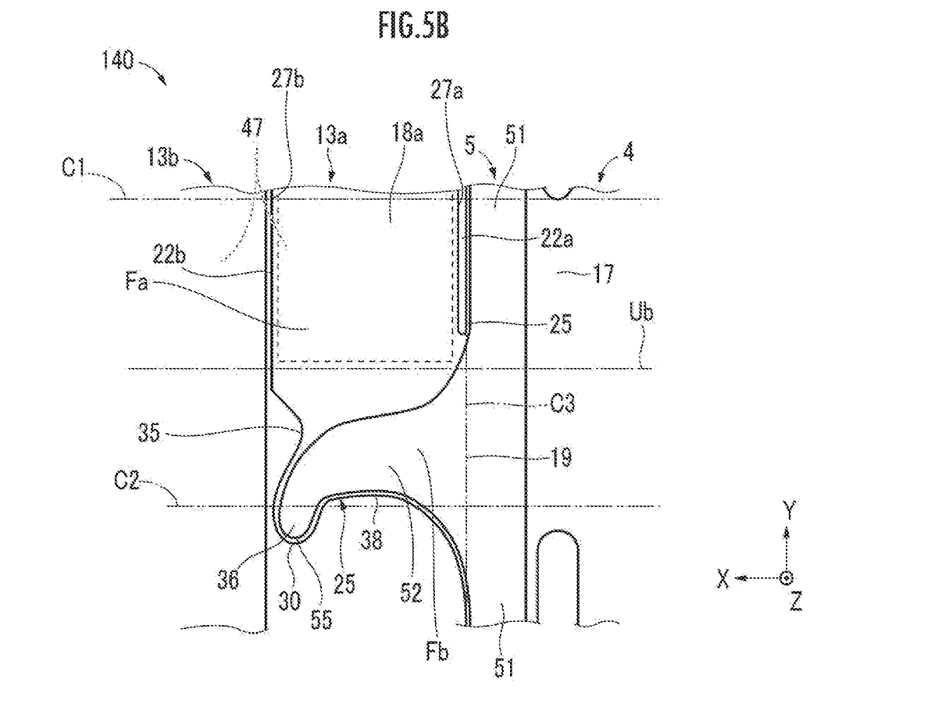

The inner recess 37 is formed in the end portion on the distal end side of the piezoelectric cantilever 13a of the vertical side 22a. The inner recess 37 is concave toward the piezoelectric cantilever 13b in the X-axis direction. More specifically, the inner recess 37 is formed at a position between the marking line C1 and the marking line C2 and closer to the marking line C1 in the Y-axis direction. The direction from the inner recess 37 toward the outer recess 35 is set along the direction of a stress propagation direction Tf (FIGS. 5A and 5B).

COMPARATIVE EXAMPLES

FIGS. 4A to 4C and FIGS. 5A and 5B illustrate the structures of the distal end portions of various types of comparative examples provided for comparison with the distal end portion of the piezoelectric cantilever 13a. The outer recess 35 is omitted in the distal end portions of the comparative examples 100, 110 and 120 in FIG. 4A to FIG. 4C. In the comparative examples 130 and 140 of FIG. 5A and FIG. 5B, the inner recess 37 is omitted, although at least either the outer recess 35 or the projecting end 55 directed toward the distal end side is provided.

Referring to FIGS. 4A to 4B and FIGS. 5A and 5B, the stress propagation direction Tf indicates the propagation direction of the stress that propagates to the distal end portion from the inner frame 5 when the normal line of the center O of the reflector 2 coincides with the Z-axis in the period during which the reflector 2 oscillates about the first axis Ua and the second axis Ub by being driven by the inner piezoelectric actuators 4 and the outer piezoelectric actuators 6. The first axis Ua and the second axis Ub coincide with the Y-axis and the X-axis, respectively, when the normal line of the center O of the reflector 2 coincides with the Z-axis.

The stress propagation direction Tf is inclined with respect to the X-axis rather than being parallel to the X-axis. More specifically, the stress propagation direction Tf inclines at a predetermined angle on a negative side in the Y-axis direction from the proximal end to the distal end.

Figure 4A:
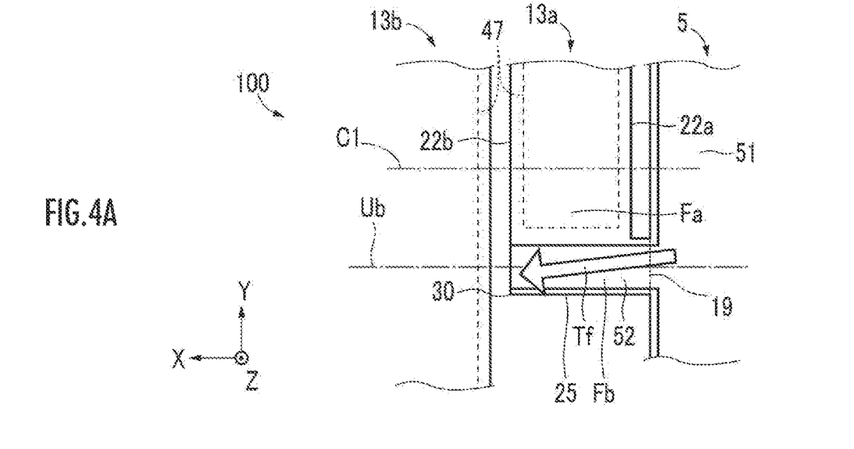
FIG. 4A, FIG. 4B, and FIG. 4C are diagrams illustrating the structures of the distal end portions of various comparative examples.

The distal end portion of a comparative example 100 of FIG. 4A differs from the distal end portion of the light deflector 1 in the following two aspects: (1) the vertical side 22b is formed by a straight line that is parallel to the Y-axis over the full length, while the horizontal side 25 is formed by a straight line that is parallel to the X-axis over the full length, and the intersection angle of the vertical side 22b and the horizontal side 25 is a right angle; and (2) the projecting rib 52 projects in parallel to the X-axis at a fixed width over the full length.

Figure 4B:
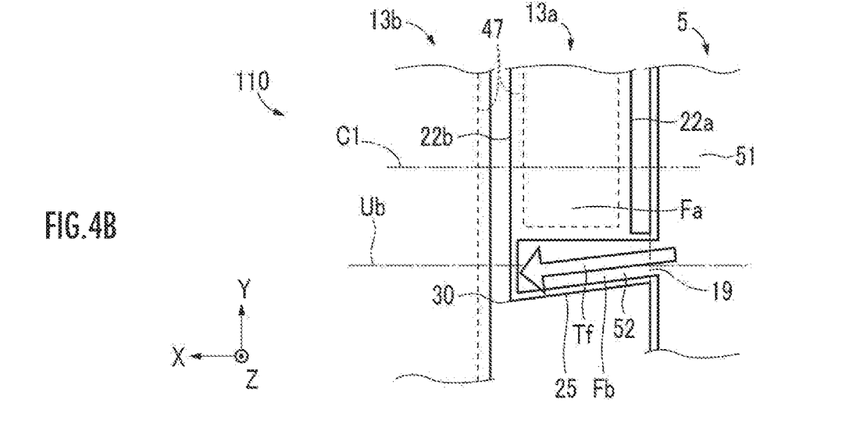

The distal end portion of a comparative example 110 of FIG. 4B differs from the distal end portion of the comparative example 100 in the following two aspects: (1) the horizontal side 25 is formed by an inclined line along the stress propagation direction Tf; and (2) the width of the projecting rib 52 in the Y-axis direction gradually increases toward the piezoelectric cantilever 13b.

Figure 4C:
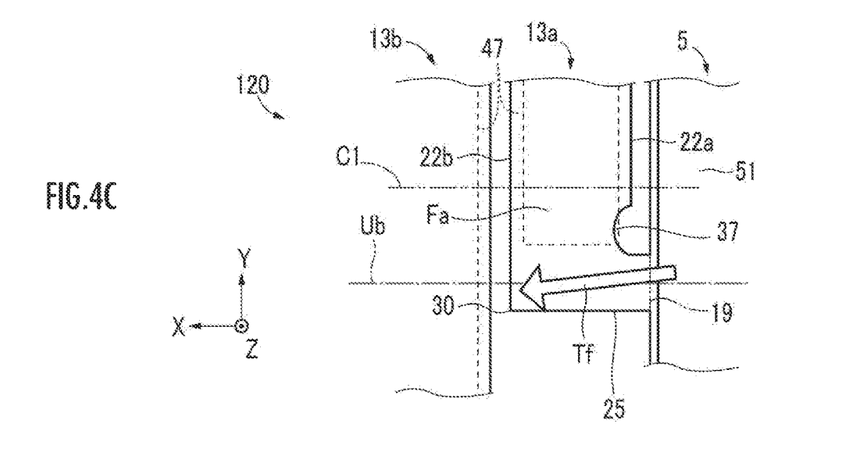

The distal end portion of a comparative example 120 of FIG. 4C differs from the distal end portion of the comparative example 100 in the following two aspects: (1) the projecting rib 52 is omitted; and (2) the vertical side 22a has an inner recess 37 which is similar to that of the distal end portion of the light deflector 1.

The distal end portion of a comparative example 130 of FIG. 5A differs from the distal end portion of the light deflector 1 in the following three aspects: (1) the outer recess 35 of the vertical side 22b is omitted; (2) the horizontal side 25 is formed of a straight line inclined to the positive side in the Y-axis direction toward the corner 30 from the root 19; and (3) the projecting end 55 of the projecting rib 52 is directed to the proximal end of the piezoelectric cantilever 13a.

The distal end portion of a comparative example 140 of FIG. 5B differs from the distal end portion of the light deflector 1 in that the inner recess 37 is omitted.

(Comparison of Stresses)

Table 1 below indicates the stress values of the root 19 and an anti-root in each distal end portion of the light deflector 1 and the comparative example 100 to the comparative example 140. The anti-root refers to a portion that extends along the piezoelectric cantilever 13b in the distal end portion of the piezoelectric cantilever 13a. In the distal end portion of the piezoelectric cantilever 13a, the two sides in the X-axis direction are formed of the root 19 and the anti-root.

TABLE 1

| Portion of bent part | Embodiment of the present invention | Comparative Example100 | Comparative Example110 | Comparative Example120 | Comparative Example130 | Comparative Example140 |
|---|---|---|---|---|---|---|
| Root | 32.4 | 50.7 | 34.8 | 48.2 | 66.1 | 82.5 |
| Anti-root | 16.3 | 50.7 | 81.9 | 11.8 | 33.4 | 15.0 |

In Table 1, larger values mean higher stress, although the unit of stress is not shown.

The comparison in stress between the comparative example 100 and the comparative example 110 shows that increasing the width of the piezoelectric cantilever 13a in the Y-axis direction, as in the comparative example 110, makes it possible to improve, i.e. reduce, the stress of the root 19 accordingly. However, the stress of the anti-root inconveniently increases.

The comparison in stress between the comparative example 100 and the comparative example 120 shows that omitting the projecting rib 52 and setting the vertical side 22b and the horizontal side 25 to be orthogonal to each other, as in the comparative example 120, improves the stress of the anti-root. However, it is also shown that the stress of the anti-root 19 is not yet sufficiently lower, leaving room for improvement.

The comparison in stress between the comparative example 130 and the comparative example 140 shows that the stress of the anti-root can be significantly improved by directing the projecting end 55 of the projecting rib 52 toward the edge side in the Y-axis direction, as in the comparative example 140.

From the comparisons described above, the inventors have found that forming the outer recess 35 as in the comparative example 140 greatly contributes to a reduction in the stress of the anti-root of the distal end portion. In addition, the inventors have further found that the stress of the anti-root can be further improved by directing the projecting end 55 of the projecting rib 52 toward the distal end in the longitudinal direction of the piezoelectric cantilever 13a, as in the comparative example 140.

The inventors have further found that the stresses of the root 19 and the anti-root in the distal end portion of the piezoelectric cantilever 13a can both be improved, as in the embodiment of the present invention (i.e. the light deflector 1) in Table 1, by adding the inner recess 37 to the vertical side 22a, as in the comparative example 120.

The inventors have also studied whether the damage to the distal end portion can be restrained by increasing the width (the dimension in the X-axis direction) of the piezoelectric cantilever 13a, in place of the outer recess 35, the inner recess 37 and the projecting end 55 directed toward the edge side. As a comparative example for this purpose, the dimension in the X-axis direction of the distal end portion in FIG. 4A was increased. Further, the distal end portions of this comparative example and the light deflector 1 were compared in terms of limit deflection angle of the reflector 2 about the second axis Ub.

The result indicated that the limit deflection angle of the light deflector of the comparative example in which the width of the piezoelectric cantilever 13a has been increased was 13.5 degrees, while the limit deflection angle of the light deflector 1 was 18 degrees. The comparative example is inferior in the limit deflection angle to the light deflector 1 and the increased width of the piezoelectric cantilever 13a disadvantageously leads to an increase in the size of the light deflector.

The value of the limit deflection angle is indicated by the absolute value of a maximum deflection angle on a positive side or a negative side, a half value, i.e. the deflection angle obtained when the reflector 2 faces directly forward being defined as zero degrees. Therefore, in the light deflector 1, the reflector 2 oscillates at a deflection angle of 36 degrees (=18 degrees×2) about the second axis Ub.

Modification Example

In the light deflector 1 according to the embodiment, the inner piezoelectric actuators 4 acting as the first piezoelectric actuators that oscillate the reflector 2 about the first axis Ua by twisting the torsion bars 3, and the inner frame 5 that oscillates the reflector 2 about the X-axis by the outer piezoelectric actuators 6 acting as the second piezoelectric actuators are shaped like the track of an athletic stadium in a front view. However, the light deflector in accordance with the present invention can be formed in other shapes (e.g. circular or elliptical).

The light deflector 1 of the embodiment is provided with all the outer recess 35, the inner recess 37 and the projecting end 55 directed toward the distal end. However, the effect for restraining the damage to the distal end portion and the effect for increasing the limit deflection angle can be enhanced in steps by adding the outer recess 35, the projecting end 55 directed toward the distal end, and the inner recess 37 in this order.

In the light deflector 1 of the embodiment, the projecting end 55 of the projecting rib 52 reaches the vertical side 22b. However, in the light deflector according to the present invention, the projecting end of the projecting rib may be slightly separated from the vertical side 22b toward the vertical side 22a while keeping the projecting end in the corner portion 36.

In the light deflector 1 of the embodiment, the encircling rib 51 is formed over the full width of the rear surface of the inner frame 5. However, in the light deflector according to the present invention, the encircling rib may be formed only on one side of the width of the inner frame, omitting the encircling rib on the other side thereof.

In the light deflector 1 of the embodiment, the inner frame 5 is shaped like the track of an athletic stadium. However, in the light deflector according to the present invention, the inner frame may be formed in other circular shapes which are longer in the direction of the first axes thereof than in the direction of the second axes thereof, such as an elliptical shape, or further an annular shape.

It will be appreciated by persons skilled in the art that the disclosed technique is not limited to what has been particularly shown and described hereinabove. Rather the scope of the disclosed technique is defined only by the claims, which follow.

What is claimed is:

1. A light deflector comprising:
   a reflector which reflects light incident upon a front surface side;
   an inner frame which surrounds the reflector,
   an outer frame which surrounds the inner frame;
   a pair of torsion bars which extend out of the reflector in the direction of a first axis out of the first axis and a second axis, which intersect with each other at right angles at the center of the reflector;
   an inner piezoelectric actuator which is interposed between the inner frame and the pair of torsion bars and which oscillates the reflector about the first axis through the pair of torsion bars; and
   an outer piezoelectric actuator which has a plurality of piezoelectric cantilevers joined by a meander pattern configuration, in which a first piezoelectric cantilever and a last piezoelectric cantilever in a configuration order from the inner frame side to the outer frame are joined to the inner frame and the outer frame, respectively, and which oscillates the inner frame about the second axis,
   wherein an encircling rib is formed on the rear surface of the inner frame such that the encircling rib encircles the inner frame, a projecting rib is formed on the rear surface of a distal end portion of the first piezoelectric cantilever such that the projecting rib projects from the encircling rib and extends toward the area of a corner portion of the first piezoelectric cantilever, the area of the corner being adjacent to a second piezoelectric cantilever, the first piezoelectric cantilever has an outer recess which is concave toward the inner frame on one vertical side adjacent to the second piezoelectric cantilever, and the outer recess extends along the projecting rib at the corner portion in a part on the distal end side of the first piezoelectric cantilever.

2. The light deflector according to claim 1, wherein the projecting end of the projecting rib is directed toward the distal end of the first piezoelectric cantilever.

3. The light deflector according to claim 1, wherein the other vertical side of the first piezoelectric cantilever that is adjacent to the inner frame has an inner recess that is concave toward the second piezoelectric cantilever in the distal end portion.

4. The light deflector according to claim 3, wherein the inner frame is formed to have an annular shape or a circular shape that is longer in the direction of the first axis than in the direction of the second axis.

\* \* \* \* \*